Dec. 27, 1938.   R. R. RIDGWAY   2,141,617

BORON CARBIDE ALLOY AND METHOD OF MAKING THE SAME

Filed June 10, 1936

Inventor
RAYMOND R. RIDGWAY
By Clayton L. Jenks
Attorney

Patented Dec. 27, 1938

2,141,617

UNITED STATES PATENT OFFICE 2,141,617

BORON CARBIDE ALLOY AND METHOD OF MAKING THE SAME

Raymond R. Ridgway, Niagara Falls, N. Y., assignor to Norton Company, Worcester, Mass., a corporation of Massachusetts Application June 10, 1936, Serial No. 84,474

7 Claims. (Cl. 75—136)

This invention relates to a boron carbide alloy and to a method of making the same, and particularly a boron rich boron carbide of controlled composition which is adapted for various industrial uses.

In accordance with my prior Patent 1,897,214, boron carbide having a continuous crystalline structure free from parting planes of graphite and conforming substantially to the formula $B_4C$ has been made in an electric resistance furnace by heating a properly proportioned mixture of boron trioxide and carbon to a temperature in the vicinity of 2400° C. at which the materials of the charge react to form boron carbide and carbon monoxide. The pure material has approximately the composition of 78.3% of boron and 21.7% of carbon. A product called boron carbide has also been marketed which has a carbon content greatly in excess of the theoretical requirements for $B_4C$ and which is considered to consist of a mixture of boron carbide of unknown formula containing a large excess of free graphite intimately associated with the crystals of boron carbide. An analysis of one composition thus made heretofore has approximated 50% of boron and 40% of carbon as well as small amounts of impurities. Owing, however, to the presence of the free graphite, this material has been wholly unsatisfactory for various industrial uses. For example, the presence of the flakes of graphite interspersed with the crystals of boron carbide has prevented the mixture from being molded into a shape of any utility such as is feasible with the boron carbide made in accordance with my prior patent.

In the metallurgical field, there is a demand for a material comprising boron which may be suitably employed in the deoxidation of molten metals, such as copper, and in the manufacture of boron alloys; but the high content of free graphite in the boron carbide and carbon mixture heretofore made or the low content of boron in the boron carbide of commerce formerly sold for metallurgical purposes has made it difficult to use such materials metallurgically. It is, therefore, highly desirable to provide a boron carbide alloy which is richer in boron than the products heretofore obtained.

It is, accordingly, the primary object of this invention to make a boron carbide alloy of a high boron content and which has a controlled composition and to provide an economical and efficient method of making the same. Further objects will be apparent in the following disclosure.

In accordance with this invention, I propose to make the desired alloy by the electrical heating of reagent materials in a resistance furnace and by so controlling the composition of the charge and the power input as to produce the desired product. This invention is based on the discovery that if the boron oxide content of the furnace charge is increased over the stoichiometric requirements for making a composition corresponding with the formula $B_4C$ as set forth in my prior patent, and if the power input is held below a definite rate, then the product will contain an excess of boron which may be as high as 85 or 90% of boron with the remainder carbon. Since the optimum power input varies with the furnace construction and size, definite figures for the power input are necessarily specified with relation to the surface area of the resistor, as noted below. However, it may be generally stated that the higher the power input, the richer will be the carbon content and conversely, the lower the rate of energy input, the richer the boron content of the boron carbide composition.

The alloy may be made in a furnace of the type covered by my previous patent and which may be structurally arranged as shown in my prior application Serial No. 50,932, filed November 1, 1935. This preferred type of furnace is shown in the accompanying drawing, wherein.

Figures 1, 2:
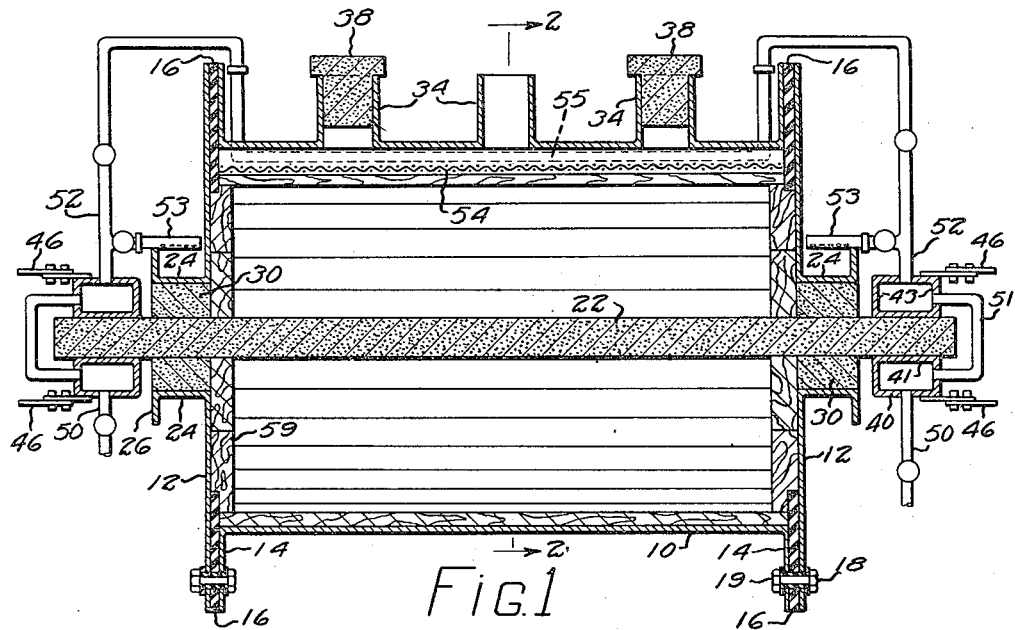
Fig. 1 is a vertical central section of the furnace.
Fig. 2 is a vertical section on the line 2—2 of Fig. 1.

As illustrated, the furnace comprises a metal casing having a cylindrical or peripheral wall 10 of iron, aluminum or other suitable metal and the two end walls 12 of similar material, which are shaped and arranged to form a cylindrical reaction chamber within which an electrical resistor is mounted substantially centrally or axially of the peripheral wall. For the purpose of fastening the peripheral wall to the end walls, the former is provided with outstanding annular flanges 14 at its two ends, thus forming a spool shaped structure. The end walls 12 are each annular in shape and coextensive with the flanges, so that they may be readily fastened together.

In order that the end walls 12 may be electrically insulated from the peripheral portion 10 of the casing, a gas tight insulation 16 of asbestos or other suitable material is placed between the flanges and the end walls. This insulation is made annular in shape and located only adjacent to the flanges 14, since it is not needed at the central portion of the furnace and particularly because it is fusible at the high temperature of the resistor. To facilitate assembly and loading of the furnace charge, the end walls are made readily removable. They are fastened to the flanges by the bolts 18 passing through aligned openings in the metal parts and the asbestos ring therebetween and secured in place by the nuts 19. The various parts of the clamping bolts and nuts are also insulated from the metal parts by means of the insulating washers as well as sleeves surrounding the bolts which may be made of any suitable material, such as asbestos.

The resistor 22 is mounted axially of the peripheral wall 10 and arranged to extend through the charge and project outwardly from each end of the casing. In order to support the resistor, each of the annular end walls 12 is provided with a cylindrical extension or hub 24 which has an outwardly extending flange 26. These parts form an annular trough within which cooling water may flow. Mounted within these cylindrical hubs 24 are graphite sleeves 30 which have been shaped to fit snugly therein and prevent the passage of gases as well as to conduct heat to the water cooled trough wall 24. The graphite sleeves 30 in turn support the resistor rod 22 which is adapted to carry the electrical current for heating the charge of material within the casing. This resistor is preferably made of graphite, although it may be made of other suitable electrically conductive material depending upon the nature of the charge being treated. This graphite rod 22 is also shaped for accurate sliding fit within the sleeves 30 so as to provide a gas tight joint and a heat conducting path. Thus the sleeve 30 serves as an enlargement on the end of the high temperature rod 22 which may be water cooled sufficiently at its outer surface so that it may be supported on the metal wall of the hub 24 and in turn cool the exposed end of the resistor rod. Being made of the same materials, the rod and the sleeve have the same coefficients of expansion and the joint therebetween cannot open to permit passage of gas to or from the furnace chamber.

Egress of the gases generated during the operation of the furnace is permitted through the pipes 34, which have open upper ends and are welded to the casing 10 around suitably shaped holes therein. Plugs 38 of graphite or other suitable material are arranged to close the passages during the cooling stage. When the furnace is running, two of the plugs may be left loosely in place to prevent any circulation of air into the casing as the generated carbon monoxide gas escapes through the third opening. These plugs are left somewhat loose however so that they may be blown out by the gas pressure and provide an emergency exit for the gas, in case the third passage becomes plugged through a building up of deposited material adjacent to the opening thereof. During the cooling step, all of the plugs may be fitted in place, or one may be allowed to remain open while kerosene is injected to provide a neutral to reducing atmosphere.

The electrical connections are made at the two ends of the graphite resistor 22 by means of clamps, which comprise two hollow casings through which water may be passed to keep them cool. Each of these casings is made of two semicylindrical concentric walls 40 and 41 connected by the diametrically positioned walls 42 and the end walls 43 to form a closed chamber. The central wall 41 of each of these clamps is shaped to fit against the outer surface of the resistor rod 22 and be clamped tightly thereagainst by means of suitable bolts and nuts.

The electrode terminals are suitably fastened to these clamping members as by welding metal strips 46 thereon, so that the electric current may be readily transmitted from an outside source of power to the resistor rod. It will be understood that various electrical apparatus well known to those skilled in the art is to be employed in connection with this furnace structure for transmitting the required electrical power to the furnace and regulating the same. Also, the dimensions of the furnace chamber and the length and cross sectional area of the resistor rod will be so proportioned as to obtain the desired electrical results. It is desirable in this type of furnace that the graphite resistor be sufficiently large relative to the size of the ingot to be made that it will not be wholly consumed or broken until the reaction has gone on for a sufficient time. It may be observed that in making boron carbide the rod is protected to a large extent by the moron carbide formed around it so that the boron oxide cannot contact and react therewith.

The exposed ends of the resistor rod and the end walls 12 are kept cool by circulating water through the hollow clamps and in the trough 24 surrounding the sleeve 30. This may be readily accomplished by means of the valved water pipes 50 which communicate from a suitable source of water supply to the lower members of the clamps. A pipe 51 connects the upper clamp with the lower member, and from each of the upper clamps a further pipe 52 carries water to the branch arm 53 where the water escapes through perforations into the upper portion of the trough 24. Likewise an extension of the pipe 52 communicates with the pipes 55 which extend longitudinally of the cylindrical wall 10 and near the top thereof. These pipes 55 are perforated so that water may issue therefrom and flow downwardly over the outer casing wall 10 for the purpose of keeping the wall cooled to a required temperature. Suitable valves may be provided for regulating the flow of water to these various parts. By using the sleeve 30, it is possible to cool the resistor rod 22 closely adjacent to the hot zone and thus further protect the end walls and the insulation within the chamber.

Located within the upper portion of the casing is a perforated wall 54 made of a coarse meshed screen of iron or other suitable metal which is arranged beneath the pipes 34 and spaced from the top of the casing wall 10 to provide a space 56 for the accumulation of gases generated within the charge and to prevent the charge from contacting with and closing the openings of the pipes 34. These screens may be welded in place if desired, or slidably secured by means of the metal strips 57 welded to and projecting downwardly from the wall 10. This space 56 thus provides a passage for the accumulation and escape of the large volume of carbon monoxide gas which is liberated during the furnace run. The exit pipe 34 may be connected to further piping to conduct the gas away from the furnace for such use as may be desired and particularly to prevent its escape into the room. Or, the gas may be allowed to burn quietly at the end of the exit tube 34. It will be appreciated that because of the generation of the large volume of gas during the furnace run, no air can enter the exit passage 34. Because of the large space 56 provided in the upper portion of the reaction chamber, there is also little danger of the boron metal vapor escaping through a small blow hole in the charge, and the temperature of the chamber 56 is sufficiently low so that the vapors are condensed therein and are retained in the charge.

It is desirable that the granular furnace charge itself serve as the container within which the ingot of metal carbide may be formed. Consequently, the furnace chamber is made sufficiently large so as to provide room for an outer zone of the cooled charge which in turn supports the inner hot zone within which the ingot is made. Thus, the charge itself serves as a protection for the inner cooled wall of iron and neither the boron oxide nor any reaction product will attack this wall, nor will the wall material react with the charge to detrimentally affect the properties of the desired abrasive metal compound. As a further insulation, the furnace is lined with an insulative material which keeps the charge from contacting directly with the metal walls. A suitable insulation for this purpose comprises ordinary wooden boards which carbonize during the run of the furnace but are not consumed and so remain in a protective capacity. The arrangement illustrated comprises a set of boards 58 arranged parallel with the resistor rod and lining the inner furnace wall 10 except adjacent to the screen, as shown in Fig. 2. Likewise, the end walls are covered by the boards 59. The furnace walls and the charge located adjacent thereto must be kept sufficiently cool so that their conductivity is low and the danger of current leakage is small. This is accomplished by pouring water into the trough 24 and thus cooling the wall 12 by conduction. If desired, a further water spray may be thrown directly upon the end walls at any suitable point.

In accordance with the present invention, the power input to the resistor of graphite or other suitable material should be below 22 kilowatts per square foot of surface area of the resistor employed for the purpose. It is preferred that the energy density range from 18 to 20 kilowatts per square foot of resistor surface area. Then by maintaining this particular power input and by controlling the composition of the charge so as to provide the required amount of boron for the particular composition of product desired the reaction may be carried on to produce a material which may analyze as high as 90% of boron, with the rest made up of carbon and such slight amount of impurities as may be present.

While the theoretical principles underlying this invention are not fully understood, it is presumed that a higher power input with the attendant higher temperature will result in vaporizing more of the boron from the charge and driving it outwardly into the outer layers and thus make the ingot itself low in its boron content. If, on the other hand, a lower power input is employed, this serves to decrease the temperature of the resistor and charge, and it apparently decreases the tendency for the boron to vaporize and pass outwardly as well as for the carbon of the charge or of the resistor core to dissolve in the molten boron carbide at the center of the furnace. The decreased distillation of free boron metal outwardly from the central zone thus results in the boron vapor being retained in this inner zone and enriching the $B_4C$ material there present. The higher temperature may also volatilize the boron oxide or the suboxide and thus drive further boron outwardly. Such volatilizing effects all result in decreasing the boron content, hence a primary condition is that of having the temperature low enough to prevent that excessive volatilization and to permit the boron metal which is freed from its oxide to remain in the central zone of the charge.

In accordance with the preferred procedure, the boron carbide alloy may be made from a mixture of granular anhydrous boron oxide and carbon in the required stoichiometric amounts according to the principles set forth in my prior patent and application. For example, a furnace charge of 1000 pounds of anhydrous boron oxide mixed with 610 pounds of petroleum coke and heated as herein defined will produce, when completely converted, about 360 pounds of alloy having approximately the composition of 85% boron and 15% of carbon.

By carrying on these various reactions in an enclosed furnace, as shown in the drawing, nitrogen, oxygen and water vapor are excluded and the only gas present is the carbon monoxide evolved from the charge. Kerosene or other hydrocarbons may be included in the furnace charge for the purpose of providing a volatile carbonaceous gas which will aid in excluding air and other undesired gases. Hence, the alloy is not affected by the atmosphere during either the heating or the cooling stages.

If desired, this process may be carried on in two stages in which a boron rich material derived from an initial furnace run may be recycled in a second furnace run under the conditions above described so as to still further increase its boron content. The proportions of the ingredients of the charge for both the initial and the final furnacing step will, of course, be calculated to provide the necessary carbon to remove all oxygen present in the charge and to produce by reduction additional boron which will serve to enrich the ingot. It is also desirable to incorporate the reduced boron rich material from the preceding run in a zone immediately surrounding the resistor. The additional boron oxide and carbon needed for the reaction are placed around the zone containing the boron rich material. With this practice the electrically conductive nature of the pre-reduced material causes the current to distribute in this zone and, therefore, serves to further lower and distribute the temperature.

The optimum power input above defined applies to standard resistance furnace constructions used in the industry and it should not be exceeded if a high boron content is to be obtained. In any case the primary condition to be observed is that of preventing excessive volatilization of the boron content of the charge and to insure that it remains in the inner zone where it may enrich the boron carbide there present. That is, the temperature is so controlled in the reaction zone that it is held slightly below that point at which the normal boron carbide or a carbon rich boron carbide are obtained. Hence the claims which specify the exact kilowattage are to be thus broadly interpreted.

By this procedure, I make an alloy or a composition of matter having a polyphase, polycrystalline, heterogeneous or aggregate structure, comprising one phase of crystalline boron carbide of the formula $B_4C$ intimately associated with or cemented together by one or more phases of a boron rich material which has boron for its primary constituent and is substantially free from uncombined carbon in the form of graphite.

I claim:

1. The method of making boron rich boron carbide comprising the steps of providing a charge containing boron oxide and carbon and progressively heating the charge by an electrical resistor to a temperature at which said boron carbide is formed, while maintaining such an electrical power input below 22 kilowatts per square foot of surface area of the resistor that the temperature conditions will insure the formation of boron carbide having a boron content higher than is required for the formula $B_4C$.

2. The method of making boron rich boron carbide comprising the steps of providing a charge containing boron oxide and carbon proportioned stoichiometrically for making boron carbide of the formula $B_4C$ together with boron oxide and carbon proportioned for forming an excessive of boron metal so as to give a boron content of at least 85%, progressively heating the charge around an electrical resistor and maintaining such an electrical power input that the temperature will insure the formation of boron carbide of the formula $B_4C$ and is low enough to form an alloy of boron therewith and provide a total boron content of at least 85%.

3. The method of making a boron carbide alloy comprising the steps of making a boron rich boron carbide material by proportioning and electrically heating a charge of boron oxide and carbon in accordance with claim 2, and thereafter re-furnacing said material intermixed with further boron oxide and carbon proportioned to remove all of the oxygen as carbon monoxide and to provide additional boron, while maintaining a power input below 22 kilowatts per square foot of surface area of the resistor and controlling the temperature to insure the formation of an alloy of high boron content.

4. The method of making a boron carbide alloy comprising the steps of making a boron rich boron carbide material by proportioning and electrically heating a charge of boron oxide and carbon around an electrical resistor and maintaining such an electrical power input that the temperature conditions will insure the formation of boron carbide having a higher boron content than is required for the formula $B_4C$, and thereafter re-furnacing said material intermixed with further boron oxide and carbon proportioned to remove all of the oxygen as carbon monoxide and to provide additional boron, while maintaining a power input between 18 and 22 kilowatts per square foot of surface area of the resistor and controlling the temperature to insure the formation of an alloy of high boron content.

5. A composition of matter comprising mixed crystals of boron carbide of the formula $B_4C$ and a boron rich material intimately united as an aggregate which is substantially free from uncombined carbon in the form of graphite, the boron content being as high as 85% by weight.

6. An alloy comprising boron and carbon in which all of the carbon is combined in the form of $B_4C$ and in which additional boron is present in a second phase, the boron content being as high as 85% by weight.

7. The method of making boron rich boron carbide comprising the steps of providing a charge containing boron oxide and carbon proportioned stoichiometrically for making boron carbide of the formula $B_4C$ together with boron oxide and carbon proportioned for forming an excess of boron metal, progressively heating the charge around an electrical resistor and maintaining such an electrical power input between 18 and 22 kilowatts per square foot of surface area of the resistor that the temperature conditions will insure the formation of boron carbide having a higher boron content than is required for the formula $B_4C$.

RAYMOND R. RIDGWAY.